(12) United States Patent
Oishi et al.

(10) Patent No.: US 12,215,784 B2
(45) Date of Patent: Feb. 4, 2025

(54) TRANSMISSION, METHOD FOR CONTROLLING TRANSMISSION, AND NON-TRANSITORY COMPUTER-READABLE MEDIUM

(71) Applicants: JATCO Ltd, Fuji (JP); NISSAN MOTOR CO., LTD., Yokohama (JP)

(72) Inventors: Yuji Oishi, Sagamihara (JP); Takurou Kawasumi, Ebina (JP); Yoshihisa Kodama, Sagamihara (JP); Seiichirou Takahashi, Isehara (JP); Hironori Miyaishi, Sagamihara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/259,625

(22) PCT Filed: Nov. 26, 2021

(86) PCT No.: PCT/JP2021/043395
§ 371 (c)(1),
(2) Date: Jun. 28, 2023

(87) PCT Pub. No.: WO2022/153688
PCT Pub. Date: Jul. 21, 2022

(65) Prior Publication Data
US 2024/0318718 A1    Sep. 26, 2024

(30) Foreign Application Priority Data
Jan. 14, 2021   (JP) .................................. 2021-003958

(51) Int. Cl.
*F16H 61/662*        (2006.01)
*F16H 61/00*         (2006.01)

(52) U.S. Cl.
CPC ............... *F16H 61/66263* (2013.01); *F16H 2061/0037* (2013.01)

(58) Field of Classification Search
CPC ......... F16H 61/66272; F16H 61/66259; F16H 61/66254; F16H 2061/0037; F16H 61/662;
(Continued)

(56) References Cited

U.S. PATENT DOCUMENTS

| | | | |
|---|---|---|---|
| 6,513,610 B2 * | 2/2003 | Ochiai | B60W 10/06 477/44 |
| 7,112,154 B2 * | 9/2006 | Wakahara | F16H 61/0021 474/18 |

(Continued)

FOREIGN PATENT DOCUMENTS

| | | |
|---|---|---|
| JP | H07-019304 A | 1/1995 |
| JP | 2006-097811 A | 4/2006 |
| JP | 2008-020055 A | 1/2008 |

*Primary Examiner* — Henry Y Liu
(74) *Attorney, Agent, or Firm* — Foley & Lardner LLP

(57) ABSTRACT

A transmission comprising: a primary pulley; a secondary pulley; a transmission member wound around the primary pulley and the secondary pulley; an oil pump configured to supply oil; a hydraulic control circuit configured to adjust a pressure of the oil supplied from the oil pump to a line pressure which is a source pressure of a primary pulley pressure supplied to the primary pulley and a secondary pulley pressure supplied to the secondary pulley; a line pressure detection unit configured to detect the line pressure; and a controller configured to control the hydraulic control circuit, wherein the controller is configured to select, as a target pulley pressure, a higher one of a target value of the primary pulley pressure and a target value of the secondary pulley pressure, variably set, according to an oil temperature, a target differential pressure including a detection variation of the line pressure detection unit that varies (Continued)

according to the oil temperature, set a target line pressure which is a target value of the line pressure to a total pressure of the target pulley pressure and the target differential pressure, and control the hydraulic control circuit such that the detected line pressure is adjusted to the target line pressure.

5 Claims, 7 Drawing Sheets

(58) Field of Classification Search
CPC ........... F16H 2061/66204; F16H 61/66; F16H 2061/6617
USPC .......................................................... 474/28
See application file for complete search history.

(56) References Cited

U.S. PATENT DOCUMENTS

| | | | | |
|---|---|---|---|---|
| 7,118,501 B2* | 10/2006 | Yamamoto | ........ | F16H 61/66272 474/18 |
| 7,169,070 B2* | 1/2007 | Jozaki | ............. | F16H 61/66259 474/18 |
| 7,229,373 B2* | 6/2007 | Yamamoto | ........ | F16H 61/66272 474/18 |
| 7,387,589 B2* | 6/2008 | Suzuki | ............. | F16H 61/66254 474/18 |
| 7,546,196 B2* | 6/2009 | Izumi | ................ | F16H 61/66254 474/18 |
| 7,651,422 B2* | 1/2010 | Yamamoto | ........ | F16H 61/66259 474/28 |
| 7,789,780 B2* | 9/2010 | Iwasa | ..................... | F16H 59/70 474/18 |
| 7,806,791 B2* | 10/2010 | Izumi | ................ | F16H 61/66272 474/18 |
| 8,096,906 B2* | 1/2012 | Inoue | ................ | F16H 61/66272 474/18 |
| 8,157,681 B2* | 4/2012 | Iwasa | ................ | F16H 61/66259 474/28 |
| 8,827,850 B2* | 9/2014 | Kodama | ........... | F16H 61/66259 474/18 |
| 11,739,835 B2* | 8/2023 | Akiyoshi | .......... | F16H 61/66259 474/28 |
| 11,754,151 B2* | 9/2023 | Kuroki | .................. | F16H 63/065 474/28 |
| 2004/0162183 A1* | 8/2004 | Wakahara | ......... | F16H 61/66259 477/18 |
| 2004/0171444 A1* | 9/2004 | Yamamoto | ........ | F16H 61/66272 474/18 |
| 2004/0171445 A1* | 9/2004 | Yamamoto | ........ | F16H 61/66259 474/18 |
| 2005/0192131 A1* | 9/2005 | Yamamoto | ........ | F16H 61/66272 474/18 |
| 2005/0221929 A1* | 10/2005 | Oshita | ................. | B60W 10/107 474/18 |
| 2005/0221930 A1* | 10/2005 | Oshita | ..................... | F16H 61/12 474/18 |
| 2006/0073924 A1* | 4/2006 | Izumi | ................ | F16H 61/66254 474/18 |
| 2007/0082771 A1* | 4/2007 | Izumi | ................ | F16H 61/66272 474/18 |
| 2008/0004141 A1* | 1/2008 | Toyoda | ............. | F16H 61/66272 474/28 |
| 2008/0153636 A1* | 6/2008 | Inoue | ................ | F16H 61/66272 474/70 |
| 2009/0298625 A1* | 12/2009 | Kodama | ........... | F16H 61/66259 474/11 |
| 2011/0230285 A1* | 9/2011 | Hinami | ............... | F16H 61/0021 474/28 |
| 2014/0329628 A1* | 11/2014 | Kimura | ................. | F16H 61/662 474/28 |
| 2016/0047470 A1* | 2/2016 | Aoki | ........................ | F16H 9/18 474/28 |
| 2016/0061320 A1* | 3/2016 | Hattori | .................. | F16H 61/662 474/22 |

* cited by examiner

TRANSMISSION, METHOD FOR CONTROLLING TRANSMISSION, AND NON-TRANSITORY COMPUTER-READABLE MEDIUM

TECHNICAL FIELD

The present invention relates to a transmission, a method for controlling a transmission, and a program.

BACKGROUND ART

Patent Document 1 discloses a transmission that prevents a hydraulic pressure variation and reduces an excess of a line pressure by providing a line pressure sensor.

PRIOR ART DOCUMENT

Patent Document

Patent Document 1: JP 2006-097811 A

SUMMARY OF INVENTION

However, since a detection accuracy of the line pressure sensor that detects the line pressure is low, it is not possible to sufficiently reduce the excess of the line pressure.

The present invention has been made in view of such a problem, and an object thereof is to provide a transmission, a method for controlling a transmission, and a program capable of further reducing an excess of a line pressure.

According to one aspect of the present invention, a transmission comprising: a primary pulley; a secondary pulley; a transmission member wound around the primary pulley and the secondary pulley; an oil pump configured to supply oil; a hydraulic control circuit configured to adjust a pressure of the oil supplied from the oil pump to a line pressure which is a source pressure of a primary pulley pressure supplied to the primary pulley and a secondary pulley pressure supplied to the secondary pulley; a line pressure detection unit configured to detect the line pressure; and a controller configured to control the hydraulic control circuit, wherein the controller is configured to select, as a target pulley pressure, a higher one of a target value of the primary pulley pressure and a target value of the secondary pulley pressure, variably set a target differential pressure according to an oil temperature, set a target line pressure which is a target value of the line pressure to a total pressure of the target pulley pressure and the target differential pressure, and control the hydraulic control circuit such that the detected line pressure is adjusted to the target line pressure.

According to another aspect of the present invention, a method for controlling a transmission, the transmission including a primary pulley, a secondary pulley, a transmission member wound around the primary pulley and the secondary pulley, an oil pump configured to supply oil, and a hydraulic control circuit configured to adjust a pressure of the oil supplied from the oil pump to a line pressure which is a source pressure of a primary pulley pressure supplied to the primary pulley and a secondary pulley pressure supplied to the secondary pulley, the method comprising: a line pressure detection step of detecting the line pressure; and a control step of selecting, as a target pulley pressure, a higher one of a target value of the primary pulley pressure and a target value of the secondary pulley pressure, variably setting a target differential pressure according to an oil temperature, setting a target line pressure which is a target value of the line pressure to a total pressure of the target pulley pressure and the target differential pressure, and controlling the hydraulic control circuit such that the detected line pressure is adjusted to the target line pressure.

According to another aspect of the present invention, a computer-executable program for controlling a transmission, the transmission including a primary pulley, a secondary pulley, a transmission member wound around the primary pulley and the secondary pulley, an oil pump configured to supply oil, and a hydraulic control circuit configured to adjust a pressure of the oil supplied from the oil pump to a line pressure which is a source pressure of a primary pulley pressure supplied to the primary pulley and a secondary pulley pressure supplied to the secondary pulley, the program causing a computer to execute: a line pressure detection procedure of detecting the line pressure; and a control procedure of selecting, as a target pulley pressure, a higher one of a target value of the primary pulley pressure and a target value of the secondary pulley pressure, variably setting a target differential pressure according to an oil temperature, setting a target line pressure which is a target value of the line pressure to a total pressure of the target pulley pressure and the target differential pressure, and controlling the hydraulic control circuit such that the detected line pressure is adjusted to the target line pressure.

According to these aspects, an excess of a line pressure can be further reduced.

DESCRIPTION OF EMBODIMENTS

Hereinafter, an embodiment of the present invention (hereinafter, referred to as the present embodiment) will be described with reference to the accompanying drawing.

(Configuration of Transmission)

First, a transmission TM according to the present embodiment will be described with reference to FIG. 1.

Figure 1:
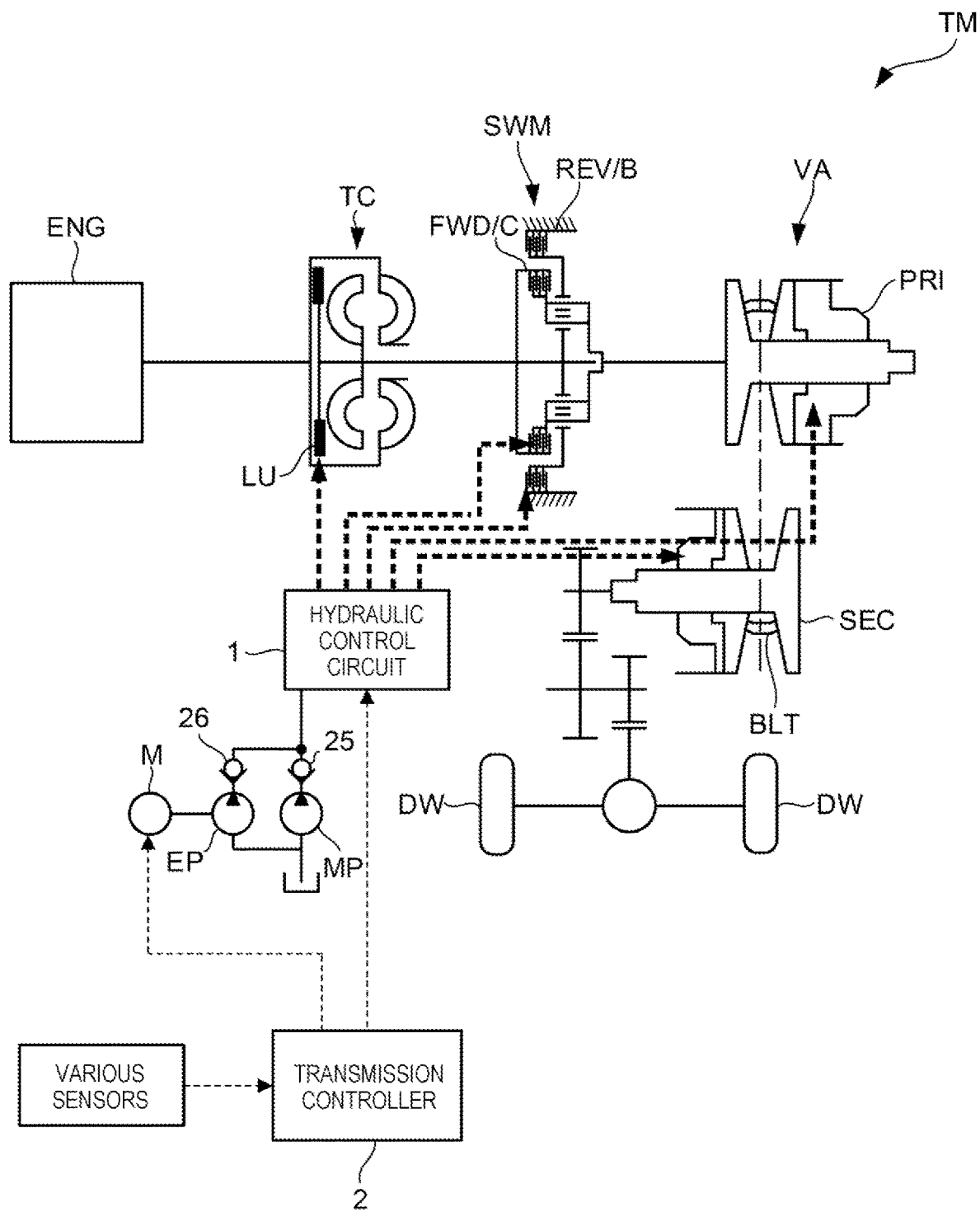
FIG. 1 is a schematic configuration diagram of a vehicle.

FIG. 1 is a schematic configuration diagram of a vehicle.

As shown in FIG. 1, the vehicle includes an engine ENG, a torque converter TC, a forward/reverse switching mechanism SWM, and a variator VA. In the vehicle, the transmission TM as an operating machine is a belt continuously variable transmission including the torque converter TC, the forward/reverse switching mechanism SWM, and the variator VA.

The engine ENG constitutes a drive source of the vehicle. Power from the engine ENG is transmitted to drive wheels DW via the torque converter TC, the forward/reverse switching mechanism SWM, and the variator VA. In other words, the torque converter TC, the forward/reverse switching mechanism SWM, and the variator VA are provided in a power transmission path connecting the engine ENG and the drive wheels DW.

The torque converter TC transmits power via a fluid. In the torque converter TC, power transmission efficiency is enhanced by engaging a lock-up clutch LU.

The forward/reverse switching mechanism SWM is provided in a power transmission path connecting the engine ENG and the variator VA. The forward/reverse switching mechanism SWM switches forward/reverse traveling of the vehicle by switching a rotation direction of rotation to be input. The forward/reverse switching mechanism SWM includes a forward clutch FWD/C engaged when a forward range is selected and a reverse brake REV/B engaged when a reverse range is selected. When the forward clutch FWD/C and the reverse brake REV/B are disengaged, the transmission TM enters a neutral state, that is, a power transmission interrupted state.

The variator VA constitutes a belt continuously variable transmission mechanism including a primary pulley PRI, a secondary pulley SEC, and a belt BLT as a transmission member wound around the primary pulley PRI and the secondary pulley SEC. A primary pulley pressure Ppri which is a hydraulic pressure of the primary pulley PRI is supplied to the primary pulley PRI from a hydraulic control circuit 1 to be described later, and a secondary pulley pressure Psec which is a hydraulic pressure of the secondary pulley SEC is supplied to the secondary pulley SEC from the hydraulic control circuit 1.

The transmission TM further includes a mechanical oil pump MP, an electric oil pump EP, and an electric motor M.

The mechanical oil pump MP pumps (supplies) oil to the hydraulic control circuit 1. A check valve 25 is provided in a flow path that allows the mechanical oil pump MP to communicate with the hydraulic control circuit 1. The mechanical oil pump MP is driven by the power from the engine ENG.

The electric oil pump EP pumps (supplies) an oil to the hydraulic control circuit 1 together with or independently of the mechanical oil pump MP. A check valve 26 is provided in a flow path that allows the electric oil pump EP to communicate with the hydraulic control circuit 1. The electric oil pump EP is provided to assist the mechanical oil pump MP. The electric motor M drives the electric oil pump EP. It may be understood that the electric oil pump EP includes the electric motor M.

The transmission TM further includes the hydraulic control circuit 1 and a transmission controller 2. The hydraulic control circuit 1 includes a plurality of flow paths and a plurality of hydraulic control valves, adjusts a pressure of the oil supplied from the mechanical oil pump MP and the electric oil pump EP, and supplies the oil to each part of the transmission TM.

Figure 2:
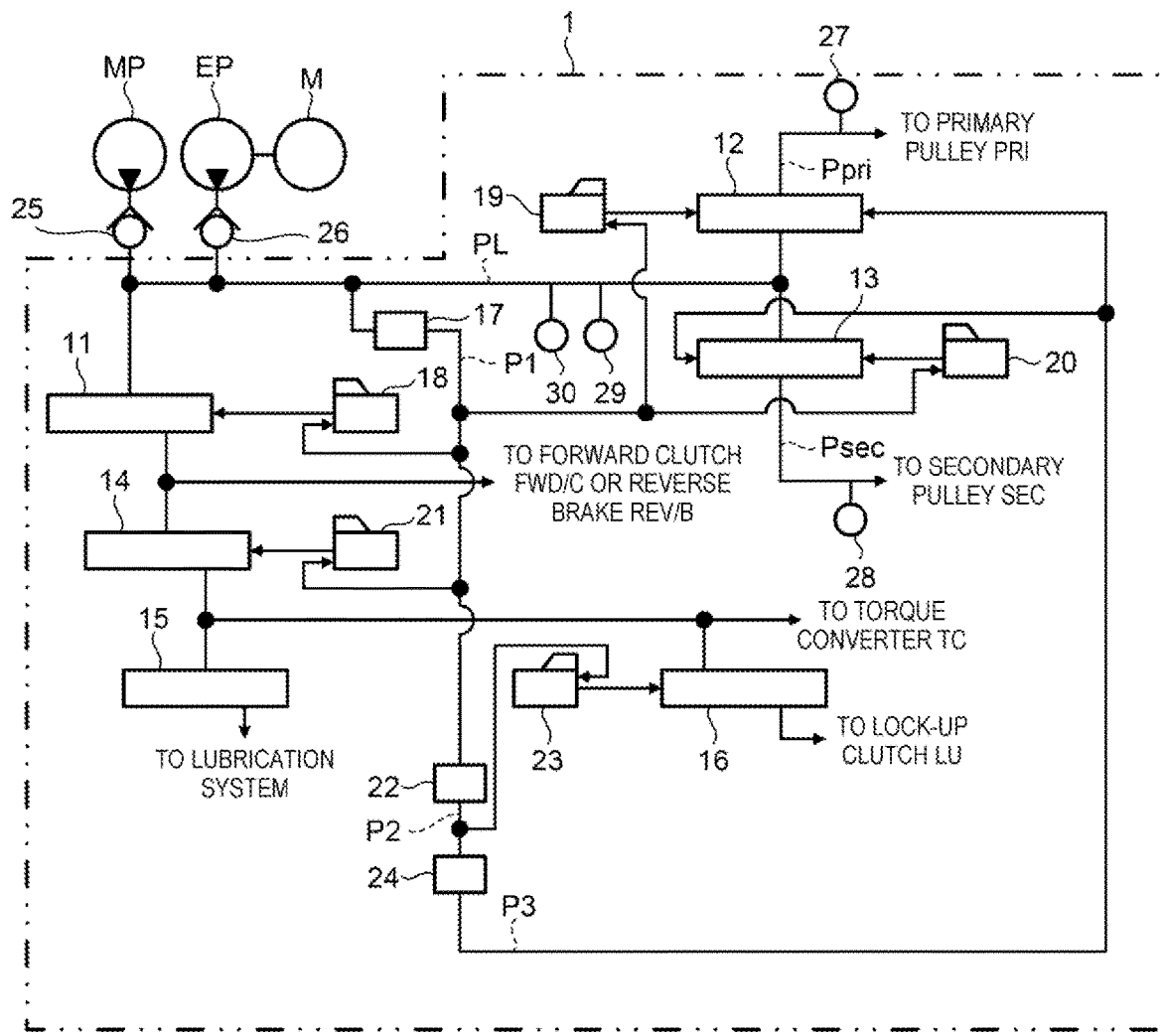
FIG. 2 is a schematic configuration diagram of a hydraulic control circuit.
Figure 3:
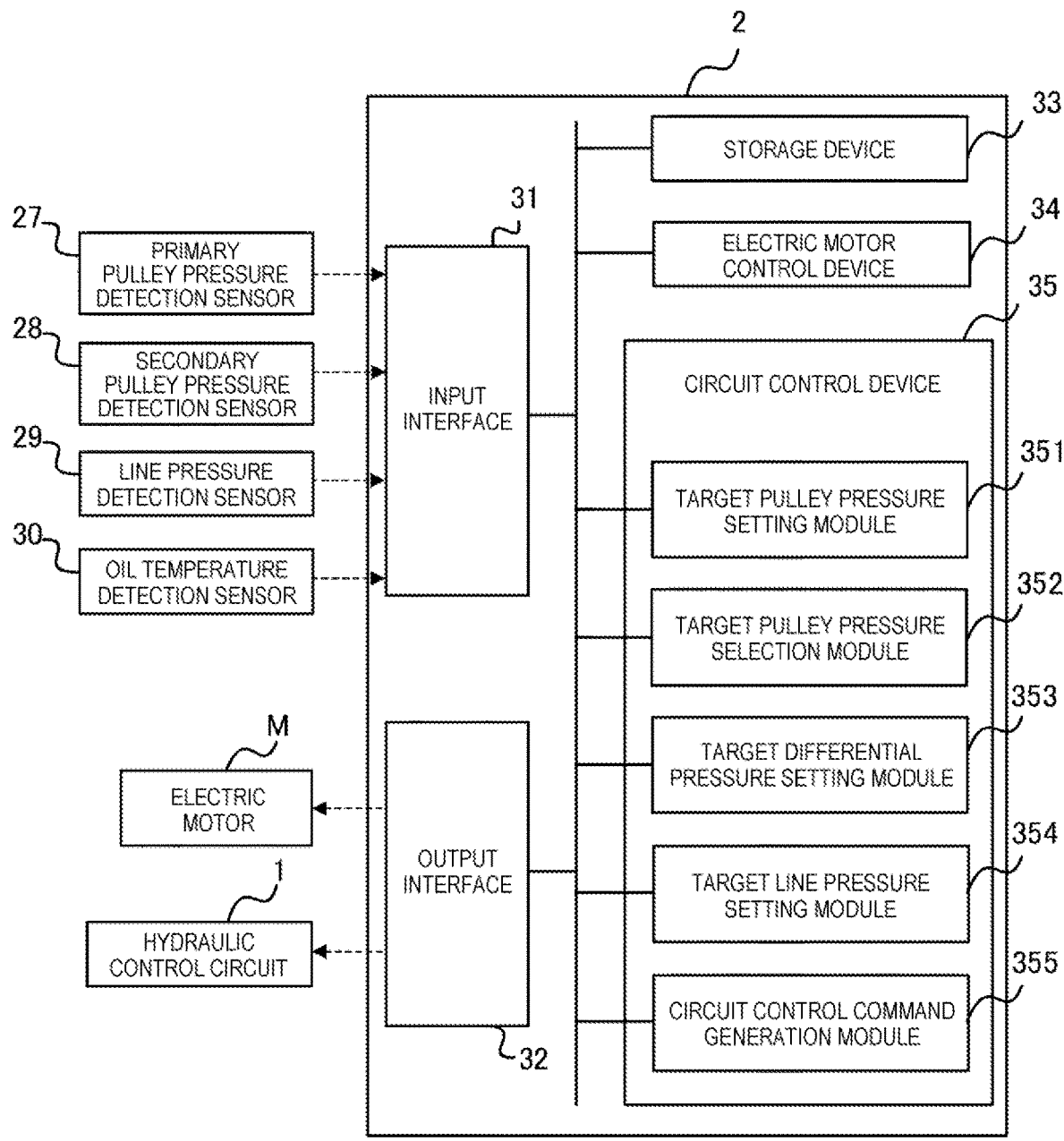
FIG. 3 is a configuration block diagram showing a transmission controller and main configurations connected to the transmission controller.

The transmission controller 2 is a controller for controlling the transmission TM, and controls the hydraulic control circuit 1 and the electric motor M that drives the electric oil pump EP, based on signals output from various sensors (specifically, including a primary pulley pressure detection sensor 27, a secondary pulley pressure detection sensor 28, a line pressure detection sensor 29, and an oil temperature detection sensor 30, see FIGS. 2 and 3) and the like. In the present embodiment, the transmission controller 2 is implemented by a CPU as a computer, but is not limited thereto, and may be implemented by a plurality of microcomputers, for example. Details of the transmission controller 2 will be described later.

The hydraulic control circuit 1 performs hydraulic control over the lock-up clutch LU, the forward clutch FWD/C, the reverse brake REV/B, the primary pulley PRI, the secondary pulley SEC, and the like based on a command from the transmission controller 2.

(Configuration of Hydraulic Control Circuit)

Next, the hydraulic control circuit 1 will be described with reference to FIG. 2.

FIG. 2 is a schematic configuration diagram of the hydraulic control circuit 1.

As shown in FIG. 2, the hydraulic control circuit 1 includes a pressure regulator valve 11, a primary regulator valve 12, a secondary regulator valve 13, a clutch regulator valve 14, a torque converter regulator valve 15, a lock-up regulator valve 16, a first pilot valve 17, a line pressure solenoid valve 18, a primary solenoid valve 19, a secondary solenoid valve 20, a clutch pressure solenoid valve 21, a second pilot valve 22, a lock-up solenoid valve 23, and a third pilot valve 24.

The pressure regulator valve 11 adjusts a pressure of the oil discharged from at least one of the mechanical oil pump MP and the electric oil pump EP to a line pressure PL. The line pressure PL is a source pressure of a pulley pressure to be described later. A broken line indicating the line pressure PL indicates a hydraulic pressure, not an oil path. The pressure regulator valve 11 performs pressure adjustment while draining a part of the oil discharged from the oil pump. The oil adjusted to the line pressure PL is supplied to the primary regulator valve 12, the secondary regulator valve 13, and the first pilot valve 17.

The primary regulator valve 12 and the secondary regulator valve 13 are pulley pressure control valves, and control the pulley pressure by adjusting, to the pulley pressure, a pressure of the oil adjusted to the line pressure PL. The pulley pressure is the primary pulley pressure Ppri in a case of the primary regulator valve 12, and is the secondary pulley pressure Psec in a case of the secondary regulator valve 13.

The oil drained from the pressure regulator valve 11 is supplied to the clutch regulator valve 14. The clutch regulator valve 14 adjusts a pressure of the oil drained from the pressure regulator valve 11 to a clutch pressure. The oil adjusted to the clutch pressure is selectively supplied to either the forward clutch FWD/C or the reverse brake REV/B. The clutch regulator valve 14 performs pressure adjustment while draining a part of the oil.

The oil drained from the clutch regulator valve 14 is supplied to the torque converter regulator valve 15. The torque converter regulator valve 15 adjusts the pressure of the oil drained from the clutch regulator valve 14 to a converter pressure of the torque converter TC. The torque converter regulator valve 15 performs pressure adjustment while draining a part of the oil, and the drained oil is supplied to a lubrication system in the transmission TM. The oil adjusted to the converter pressure is supplied to the torque converter TC and the lock-up regulator valve 16.

The lock-up regulator valve 16 adjusts the pressure of the oil adjusted to the converter pressure to a lock-up pressure. The lock-up clutch LU is subjected to lock-up control based on a lock-up differential pressure which is a differential pressure between the converter pressure and the lock-up pressure. The oil adjusted to the lock-up pressure is supplied to the lock-up clutch LU.

The pressure regulator valve 11 performs the pressure adjustment based on a signal pressure generated by the line pressure solenoid valve 18. The same applies to the primary regulator valve 12 and the primary solenoid valve 19, the secondary regulator valve 13 and the secondary solenoid valve 20, the clutch regulator valve 14 and the clutch pressure solenoid valve 21, and the lock-up regulator valve 16 and the lock-up solenoid valve 23.

A first pilot pressure P1 is introduced as a source pressure into each of the line pressure solenoid valve 18, the primary solenoid valve 19, the secondary solenoid valve 20, and the clutch pressure solenoid valve 21. The first pilot pressure P1 is generated by the first pilot valve 17 using the line pressure PL as a source pressure. The first pilot pressure P1 is also introduced into the second pilot valve 22.

The second pilot valve 22 generates a second pilot pressure P2 using the first pilot pressure P1 as a source pressure. The second pilot pressure P2 is set to be equal to or greater than a lower limit of a set range of the line pressure PL. The second pilot pressure P2 is set in advance in consideration of controllability of the lock-up clutch LU. The second pilot pressure P2 is introduced into the lock-up solenoid valve 23 and the third pilot valve 24.

The lock-up solenoid valve 23 generates a lock-up signal pressure using the second pilot pressure P2 as a source pressure. The lock-up signal pressure is a signal pressure generated by the lock-up solenoid valve 23 to control the lock-up pressure of the lock-up clutch LU of the torque converter TC.

The third pilot valve 24 generates a third pilot pressure P3 using the second pilot pressure P2 as a source pressure. The third pilot pressure P3 is set smaller than the lower limit of the set range of the line pressure PL. The third pilot pressure P3 is set in advance in consideration of damping performance of the primary regulator valve 12 and the secondary regulator valve 13. The third pilot pressure P3 is introduced as a damping pressure into the primary regulator valve 12 and the secondary regulator valve 13.

The third pilot pressure P3 introduced as the damping pressure is introduced into the primary regulator valve 12 so as to oppose a primary signal pressure. The primary signal pressure is a signal pressure generated by the primary solenoid valve 19 to control the primary pulley pressure Ppri.

Similarly, the third pilot pressure P3 introduced as the damping pressure is introduced into the secondary regulator valve 13 so as to oppose a secondary signal pressure. The secondary signal pressure is a signal pressure generated by the secondary solenoid valve 20 to control the secondary pulley pressure Psec.

The hydraulic control circuit 1 is provided with the primary pulley pressure detection sensor 27 as a primary pulley pressure detection unit for detecting the primary pulley pressure Ppri of the primary pulley PRI, the secondary pulley pressure detection sensor 28 as a secondary pulley pressure detection unit for detecting the secondary pulley pressure Psec of the secondary pulley SEC, the line pressure detection sensor 29 as a line pressure detection unit for detecting the line pressure PL, and the oil temperature detection sensor 30 as an oil temperature detection unit for detecting an oil temperature T of the oil supplied from the mechanical oil pump MP or the electric oil pump EP.

(Configuration of Transmission Controller)

Next, the transmission controller 2 will be described with reference to FIG. 3.

FIG. 3 is a configuration block diagram showing the transmission controller 2 and main configurations connected to the transmission controller 2.

As shown in FIG. 3, the transmission controller 2 includes an input interface 31, an output interface 32, a storage device 33, an electric motor control device 34, and a hydraulic control circuit control device 35 (hereinafter, simply referred to as a circuit control device 35) that are electrically connected to each other.

The input interface 31 receives an output signal from the primary pulley pressure detection sensor 27 for detecting the primary pulley pressure Ppri supplied to the primary pulley PRI, an output signal from the secondary pulley pressure detection sensor 28 for detecting the secondary pulley pressure Psec supplied to the secondary pulley SEC, an output signal from the line pressure detection sensor 29 for detecting the line pressure PL, and an output signal from the oil temperature detection sensor 30 for detecting the oil temperature T of the oil supplied from the mechanical oil pump MP or the electric oil pump EP.

A motor control command generated by a process of the electric motor control device 34 and a circuit control command generated by a process of the circuit control device 35 are respectively output to the electric motor M and the hydraulic control circuit 1 via the output interface 32.

The storage device 33 is a memory for temporarily storing parameters included in the output signals from the various sensors (the primary pulley pressure detection sensor 27, the secondary pulley pressure detection sensor 28, the line pressure detection sensor 29, and the oil temperature detection sensor 30). In addition, the storage device 33 stores a pulley pressure setting table and a target differential pressure setting table to be described later.

Further, the storage device 33 stores a process program and an algorithm program to be executed by the electric motor control device 34 and the circuit control device 35. In the present embodiment, the storage device 33 is built in the transmission controller 2, but is not limited thereto, and may be provided separately from the transmission controller 2, for example.

The electric motor control device 34 generates a motor control command based on the output signals from the various sensors and the like, and outputs the generated motor control command to the electric motor M via the output interface 32.

The circuit control device 35 generates a circuit control command based on the output signals from the various sensors and the like, and outputs the generated circuit control command to the hydraulic control circuit 1 via the output interface 32.

The circuit control device 35 includes a target pulley pressure setting module 351 as a target pulley pressure setting unit, a target pulley pressure selection module 352 as a target pulley pressure selection unit, a target differential pressure setting module 353 as a target differential pressure setting unit, a target line pressure setting module 354 as a target line pressure setting unit, and a circuit control command generation module 355 as a circuit control command generation unit. Details of the target pulley pressure setting module 351, the target pulley pressure selection module 352, the target differential pressure setting module 353, the target line pressure setting module 354, and the circuit control command generation module 355 will be described later in a control process of the hydraulic control circuit 1.

(Control Process of Hydraulic Control Circuit)

Next, the control process of the hydraulic control circuit 1 (a control process of the transmission TM) will be described with reference to FIGS. 4 to 7.

Figure 4:
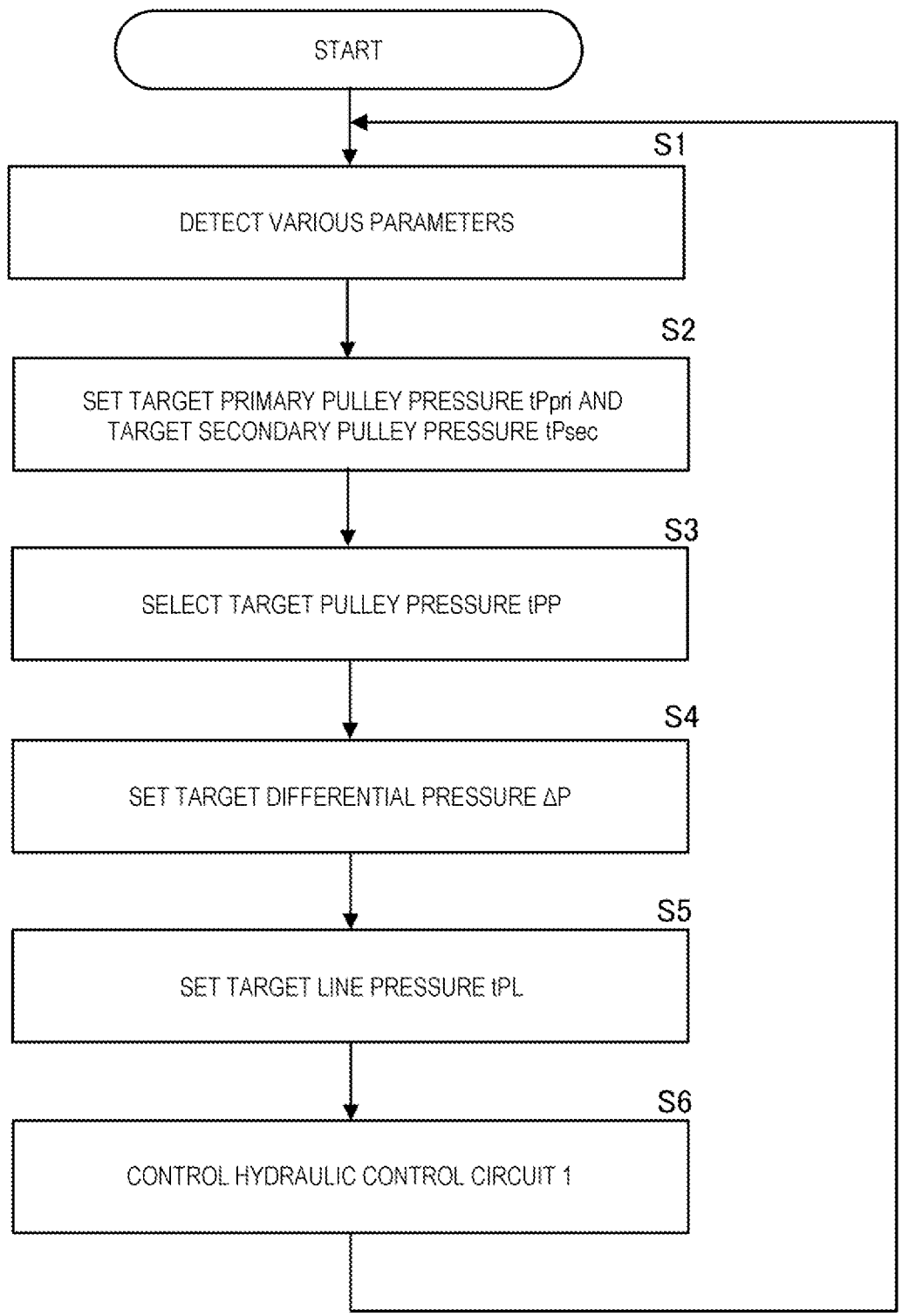
FIG. 4 is a flowchart showing a control process of the hydraulic control circuit.
Figure 5:
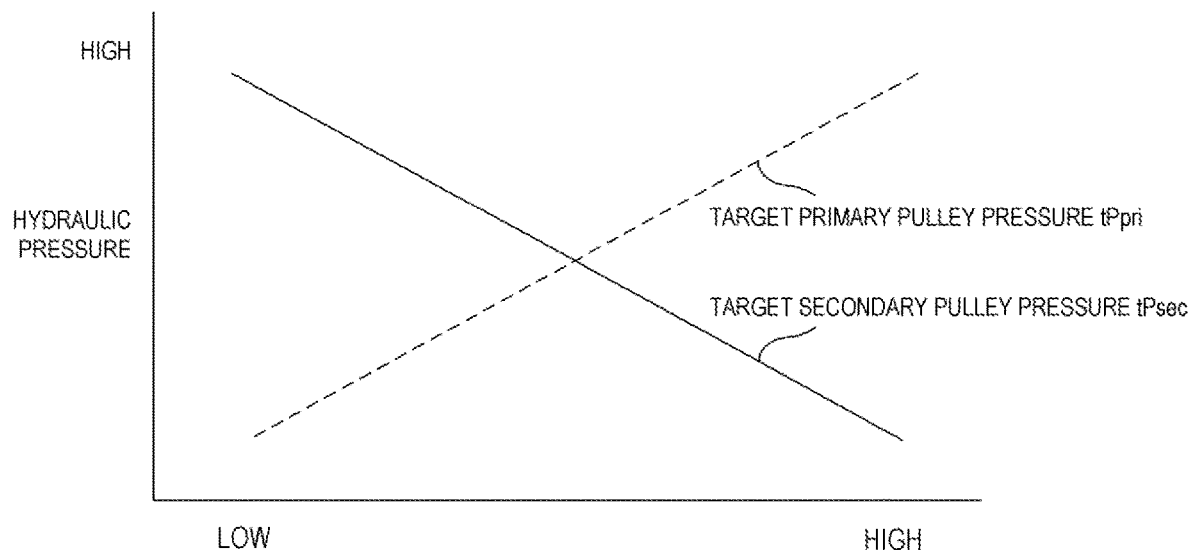
FIG. 5 is a table for setting a target pulley pressure.
Figure 6:
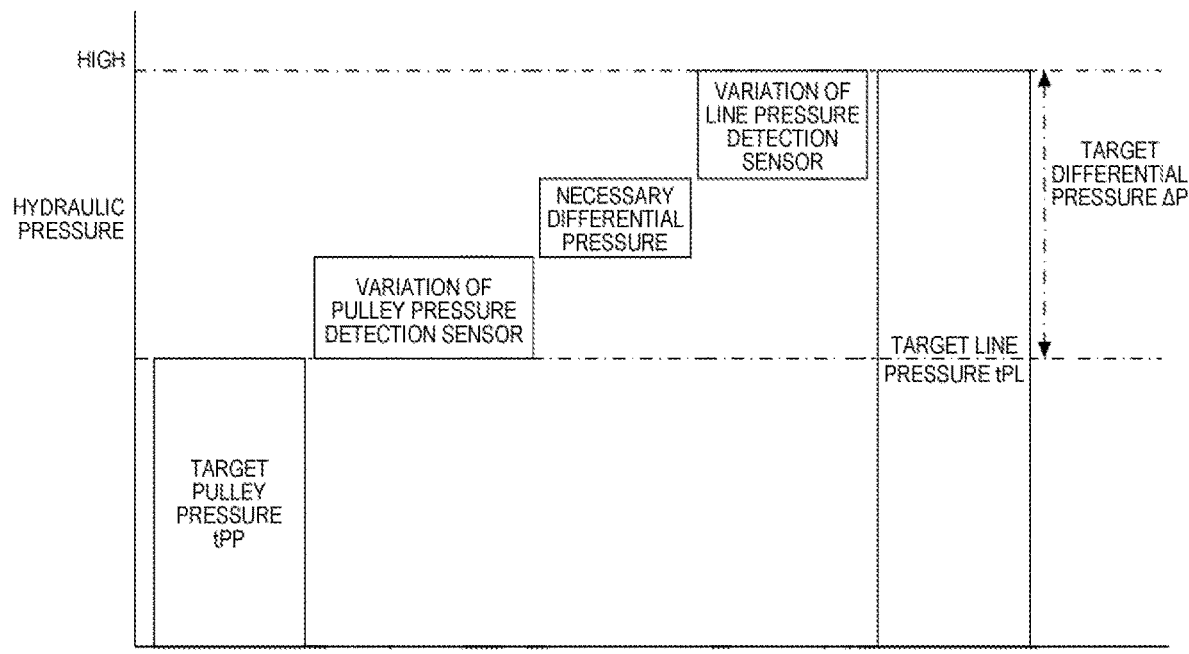
FIG. 6 is an explanatory diagram illustrating a target differential pressure.
Figure 7:
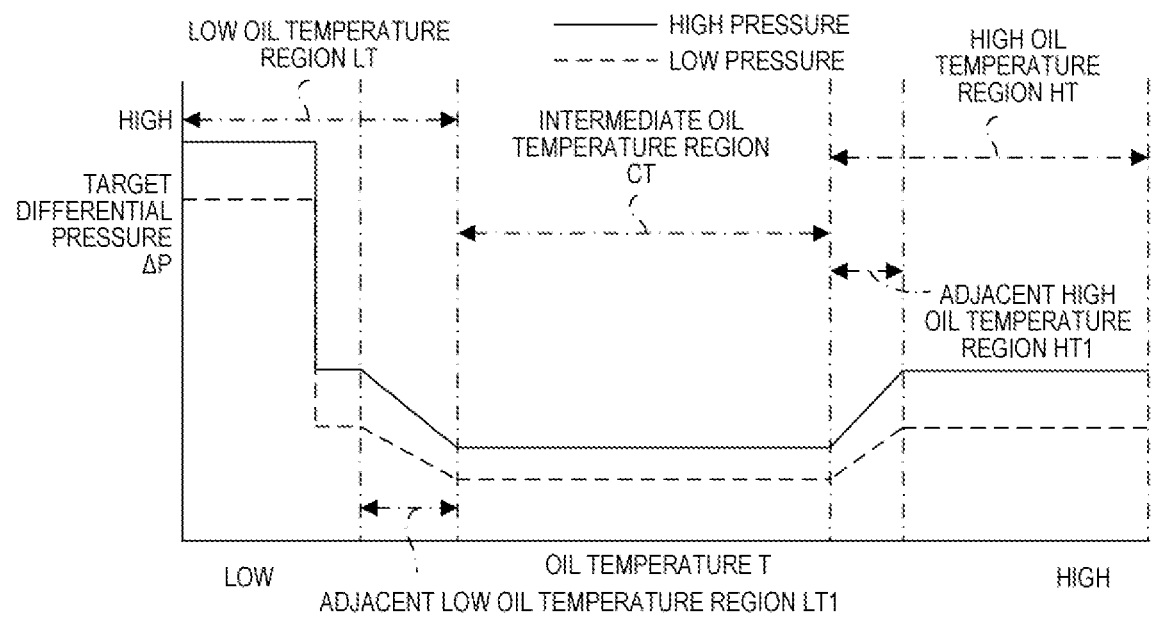
FIG. 7 is a table for setting the target differential pressure.

FIG. 4 is a flowchart showing the control process of the hydraulic control circuit 1. FIG. 5 is a table for setting a target pulley pressure. FIG. 6 is an explanatory diagram illustrating a target differential pressure ΔP. FIG. 7 is a table for setting the target differential pressure ΔP and showing a change in the target differential pressure ΔP according to an oil temperature region.

As shown in FIG. 4, first, in step S1, the various sensors detect various parameters. Specifically, the primary pulley pressure detection sensor 27, the secondary pulley pressure detection sensor 28, the line pressure detection sensor 29, and the oil temperature detection sensor 30 detect the primary pulley pressure Ppri, the secondary pulley pressure Psec, the line pressure PL, and the oil temperature T of the oil, respectively.

Then, the primary pulley pressure detection sensor 27, the secondary pulley pressure detection sensor 28, the line pressure detection sensor 29, and the oil temperature detection sensor 30 output the detected primary pulley pressure Ppri, secondary pulley pressure Psec, line pressure PL, and oil temperature T to the input interface 31 of the transmission controller 2. Then, the input interface 31 outputs the oil temperature T to the target differential pressure setting module 353, and outputs the primary pulley pressure Ppri, the secondary pulley pressure Psec, and the line pressure PL to the circuit control command generation module 355, and the process proceeds to step S2.

Next, in step S2, the target pulley pressure setting module 351 of the circuit control device 35 sets a target primary pulley pressure tPpri which is a target value of the primary pulley pressure Ppri and a target secondary pulley pressure tPsec which is a target value of the secondary pulley pressure Psec based on a speed ratio of the transmission TM.

Specifically, in step S2, the target pulley pressure setting module 351 sets the target primary pulley pressure tPpri and the target secondary pulley pressure tPsec based on the speed ratio of the transmission TM and the pulley pressure setting table (see FIG. 5) that is stored in the storage device 33. Then, the target pulley pressure setting module 351 outputs the set target primary pulley pressure tPpri and target secondary pulley pressure tPsec to the target pulley pressure selection module 352 and the circuit control command generation module 355, and the process proceeds to step S3.

Next, in step S3, the target pulley pressure selection module 352 selects, as a target pulley pressure tPP, a higher one of the target primary pulley pressure tPpri and the target secondary pulley pressure tPsec output from the target pulley pressure setting module 351. Then, the target pulley pressure selection module 352 outputs the selected target pulley pressure tPP to the target line pressure setting module 354, and the process proceeds to step S4.

Next, in step S4, the target differential pressure setting module 353 variably sets the target differential pressure ΔP according to the oil temperature T output from the input interface 31. Accordingly, the target differential pressure ΔP used for setting a target line pressure tPL to be described later is variably set according to the oil temperature T, and thus it is possible to further reduce an excess of the target line pressure tPL due to the target differential pressure ΔP, compared to a case where the target differential pressure ΔP is a fixed value. Then, the target differential pressure setting module 353 outputs the set target differential pressure ΔP to the target line pressure setting module 354, and the process proceeds to step S5.

Here, as shown in FIG. 6, the target differential pressure ΔP is a target differential pressure between the target pulley pressure tPP and the target line pressure tPL, and includes a detection variation of a pulley pressure detection sensor (specifically, the primary pulley pressure detection sensor 27 or the secondary pulley pressure detection sensor 28), a necessary target differential pressure for preventing oil vibration, and a detection variation of the line pressure detection sensor 29. In particular, the detection variation of the line pressure detection sensor 29 greatly affects the setting of the target line pressure tPL.

The inventor has found that the detection variation (that is, a detection accuracy) of the line pressure detection sensor 29 changes according to the oil temperature T of the oil.

Therefore, in step S4, the target differential pressure setting module 353 sets the target differential pressure ΔP differently according to an oil temperature region, based on the oil temperature T and the target differential pressure setting table (see FIG. 7) that is stored in the storage device 33. Accordingly, the target differential pressure ΔP used for setting the target line pressure tPL is variably set according to the oil temperature region, and thus it is possible to further reduce the excess of the target line pressure tPL due to the target differential pressure ΔP, compared to the case where the target differential pressure ΔP is the fixed value.

Specifically, in step S4, the target differential pressure setting module 353 sets the target differential pressure ΔP to be larger in a first oil temperature region in which the detection variation of the line pressure detection sensor 29 with respect to the oil temperature T is large than in a second oil temperature region in which the detection variation of the line pressure detection sensor 29 is smaller than that in the first oil temperature region. Accordingly, the target differential pressure ΔP can be appropriately set in accordance with a change in the detection variation of the line pressure detection sensor 29 due to different oil temperature regions, and thus it is possible to further reduce the excess of the target line pressure tPL due to the target differential pressure ΔP.

More specifically, in step S4, the target differential pressure setting module 353 sets the target differential pressure ΔP to be larger in a low oil temperature region LT (see FIG. 7) and a high oil temperature region HT (see FIG. 7), which are the first oil temperature region, than in an intermediate oil temperature region CT (see FIG. 7) as the second oil temperature region in which the detection variation of the line pressure detection sensor 29 is small and which is located between the low oil temperature region LT and the high oil temperature region HT.

Accordingly, by setting the target differential pressure ΔP to be large in the low oil temperature region LT and the high oil temperature region HT in which the detection variation of the line pressure detection sensor 29 is large, and setting the target differential pressure ΔP to be small in the intermediate oil temperature region CT in which the detection variation of the line pressure detection sensor 29 is small, the target differential pressure ΔP can be appropriately set in accordance with the change in the detection variation of the line pressure detection sensor 29 due to different oil temperature regions, and thus it is possible to further reduce the excess of the target line pressure tPL due to the target differential pressure ΔP.

Further, as shown in FIG. 7, in step S4, the target differential pressure setting module 353 sets the target differential pressure ΔP to be constant in an oil temperature region (for example, the intermediate oil temperature region CT) in which the detection variation of the line pressure detection sensor 29 is constant.

On the other hand, as shown in FIG. 7, in step S4, the target differential pressure setting module 353 sets the target differential pressure ΔP differently according to the different oil temperatures T in an oil temperature region in which the detection variation of the line pressure detection sensor 29 changes (for example, an adjacent low oil temperature region LT1 of the low oil temperature region LT adjacent to the intermediate oil temperature region CT or an adjacent high oil temperature region HT1 of the high oil temperature region HT adjacent to the intermediate oil temperature region CT). From a viewpoint of further increasing an accuracy of the target differential pressure ΔP, the target differential pressure setting module 353 preferably sets the target differential pressure ΔP to be larger as the detection variation of the line pressure detection sensor 29 increases.

As shown in FIG. 7, regarding a change in the target differential pressure ΔP set according to the oil temperature region, the same tendency is observed both in a case where the target line pressure tPL is a high pressure of 2.0 Mpa or more and in a case where the target line pressure tPL is a low pressure of 1.5 Mpa or less. That is, the target differential pressure ΔP is relatively large in the low oil temperature region LT and the high oil temperature region HT, and the target differential pressure ΔP is relatively small in the intermediate oil temperature region CT located between the low oil temperature region LT and the high oil temperature region HT. Therefore, it is possible to effectively reduce the target differential pressure ΔP in the intermediate oil temperature region CT in which fuel consumption is relatively good.

Next, in step S5, the target line pressure setting module 354 sets the target line pressure tPL which is a target value of the line pressure PL based on the target pulley pressure tPP output from the target pulley pressure selection module 352 and the target differential pressure ΔP output from the target differential pressure setting module 353.

Specifically, in step S5, the target line pressure setting module 354 sets the target line pressure tPL to a total pressure of the target pulley pressure tPP and the target differential pressure ΔP. Then, the target line pressure setting module 354 outputs the set target line pressure tPL to the circuit control command generation module 355, and the process proceeds to step S6.

Next, in step S6, the transmission controller 2 controls the hydraulic control circuit 1 such that the detected primary pulley pressure Ppri, secondary pulley pressure Psec, and line pressure PL are adjusted to the target primary pulley pressure tPpri, the target secondary pulley pressure tPsec, and the target line pressure tPL, respectively.

Specifically, in step S6, the circuit control command generation module 355 generates a circuit control command for controlling the hydraulic control circuit 1, based on the primary pulley pressure Ppri, the secondary pulley pressure Psec, and the line pressure PL output from the input interface 31, the target primary pulley pressure tPpri and the target secondary pulley pressure tPsec output from the target pulley pressure setting module 351, and the target line pressure tPL output from the target line pressure setting module 354.

More specifically, in step S6, the circuit control command generation module 355 generates the circuit control command such that the primary pulley pressure Ppri, the secondary pulley pressure Psec, and the line pressure PL are adjusted to the target primary pulley pressure tPpri, the target secondary pulley pressure tPsec, and the target line pressure tPL, respectively. Then, the circuit control command generation module 355 outputs the generated circuit control command to the hydraulic control circuit 1 via the output interface 32.

Then, the hydraulic control circuit 1 is controlled based on the circuit control command output from the circuit control command generation module 355, such that the primary pulley pressure Ppri, the secondary pulley pressure Psec, and the line pressure PL are adjusted to the target primary pulley pressure tPpri, the target secondary pulley pressure tPsec, and the target line pressure tPL, respectively, and the process returns to step S1.

OPERATION AND EFFECTS

Next, main functions and effects in the present embodiment will be described.

(1) The transmission TM according to the present embodiment includes the primary pulley PRI, the secondary pulley SEC, the belt BLT (transmission member) wound around the primary pulley PRI and the secondary pulley SEC, the mechanical oil pump MP or the electric oil pump EP (oil pump) configured to supply the oil, the hydraulic control circuit 1 configured to adjust the pressure of the oil supplied from the mechanical oil pump MP or the electric oil pump EP (oil pump) to the line pressure PL which is the source pressure of the primary pulley pressure Ppri supplied to the primary pulley PRI and the secondary pulley pressure Psec supplied to the secondary pulley SEC, the line pressure detection sensor 29 (line pressure detection unit) configured to detect the line pressure PL, and the transmission controller 2 (controller) configured to control the hydraulic control circuit 1. The transmission controller 2 (controller) is configured to select, as the target pulley pressure tPP, a higher one of the target value of the primary pulley pressure Ppri and the target value of the secondary pulley pressure Psec, variably set the target differential pressure ΔP according to the oil temperature T, set the target line pressure tPL which is the target value of the line pressure PL to the total pressure of the target pulley pressure tPP and the target differential pressure ΔP, and control the hydraulic control circuit 1 such that the detected line pressure PL is adjusted to the target line pressure tPL.

(4) A method for controlling the transmission TM according to the present embodiment is a method for controlling the transmission TM including the primary pulley PRI, the secondary pulley SEC, the belt BLT (transmission member) wound around the primary pulley PRI and the secondary pulley SEC, the mechanical oil pump MP or the electric oil pump EP (oil pump) configured to supply the oil, and the hydraulic control circuit 1 configured to adjust the pressure of the oil supplied from the mechanical oil pump MP or the electric oil pump EP (oil pump) to the line pressure PL which is the source pressure of the primary pulley pressure Ppri supplied to the primary pulley PRI and the secondary pulley pressure Psec supplied to the secondary pulley SEC. The method includes a line pressure detection step of detecting the line pressure PL, a setting step of selecting, as the target pulley pressure tPP, a higher one of the target value of the primary pulley pressure Ppri and the target value of the secondary pulley pressure Psec, variably setting the target differential pressure ΔP according to the oil temperature T, and setting the target line pressure tPL which is the target value of the line pressure PL to the total pressure of the target pulley pressure tPP and the target differential pressure ΔP, and a control step of controlling the hydraulic control circuit 1 such that the detected line pressure PL is adjusted to the target line pressure tPL.

(5) A program according to an embodiment is a CPU (computer)-executable program for controlling the transmission TM including the primary pulley PRI, the secondary pulley SEC, the belt BLT (transmission member) wound around the primary pulley PRI and the secondary pulley SEC, the mechanical oil pump MP or the electric oil pump EP (oil pump) configured to supply the oil, and the hydraulic control circuit 1 configured to adjust the pressure of the oil supplied from the mechanical oil pump MP or the electric oil pump EP (oil pump) to the line pressure PL which is the source pressure of the primary pulley pressure Ppri supplied to the primary pulley PRI and the secondary pulley pressure Psec supplied to the secondary pulley SEC. The program causes a CPU (computer) to execute a line pressure detection procedure of detecting the line pressure PL, a setting procedure of selecting, as the target pulley pressure tPP, a higher one of the target value of the primary pulley pressure Ppri and the target value of the secondary pulley pressure Psec, variably setting the target differential pressure ΔP according to the oil temperature T, and setting the target line pressure tPL which is the target value of the line pressure PL to the total pressure of the target pulley pressure tPP and the target differential pressure ΔP, and a control procedure of controlling the hydraulic control circuit 1 such that the detected line pressure PL is adjusted to the target line pressure tPL.

According to these configurations, the target differential pressure ΔP used for setting the target line pressure tPL is variably set according to the oil temperature T, and thus it is possible to further reduce an excess of the target line pressure tPL due to the target differential pressure ΔP, compared to a case where the target differential pressure ΔP is a fixed value. As a result, a driving torque of the mechanical oil pump MP or the electric oil pump EP can be reduced.

(2) In the transmission TM according to the present embodiment, the transmission controller 2 (controller) is configured to set the target differential pressure ΔP to be larger in the first oil temperature region in which the detection variation of the line pressure detection sensor 29 (line pressure detection unit) with respect to the oil temperature T is large than in the second oil temperature region in which the detection variation is smaller than that in the first oil temperature region.

According to this configuration, the target differential pressure ΔP can be appropriately set in accordance with a change in the detection variation of the line pressure detection sensor 29 due to different oil temperature regions, and thus it is possible to further reduce the excess of the target line pressure tPL due to the target differential pressure ΔP.

(3) In the transmission TM according to the present embodiment, the transmission controller 2 (controller) is configured to set the target differential pressure ΔP to be larger in the low oil temperature region LT and the high oil temperature region HT, which are the first oil temperature region, than in the intermediate oil temperature region CT as the second oil temperature region in which the detection variation is small and which is located between the low oil temperature region LT and the high oil temperature region HT.

According to this configuration, by setting the target differential pressure ΔP to be large in the low oil temperature region LT and the high oil temperature region HT in which the detection variation of the line pressure detection sensor 29 is large, and setting the target differential pressure ΔP to be small in the intermediate oil temperature region CT in which the detection variation of the line pressure detection sensor 29 is small, the target differential pressure ΔP can be appropriately set in accordance with the change in the detection variation of the line pressure detection sensor 29 due to different oil temperature regions, and thus it is possible to further reduce the excess of the target line pressure tPL due to the target differential pressure ΔP.

Although the embodiment of the present invention has been described above, the above embodiment merely exemplifies some of application examples of the present invention and does not intend to limit the technical scope of the present invention to the specific configurations of the above embodiment.

DESCRIPTION OF REFERENCE SIGNS

1 hydraulic control circuit
2 transmission controller (controller)
29 line pressure detection sensor (line pressure detection unit)
30 oil temperature detection sensor
35 circuit control device
EP mechanical oil pump (oil pump)
MP electric oil pump (oil pump)
TM transmission (belt continuously variable transmission)
PRI primary pulley
SEC secondary pulley
BLT belt (transmission member)

The present application claims a priority of Japanese Patent Application No. 2021-003958 filed with the Japan Patent Office on Jan. 14, 2021, all the contents of which are hereby incorporated by reference.

The invention claimed is:

1. A transmission comprising:
a primary pulley;
a secondary pulley;
a transmission member wound around the primary pulley and the secondary pulley;
an oil pump configured to supply oil;
a hydraulic control circuit configured to adjust a pressure of the oil supplied from the oil pump to a line pressure which is a source pressure of a primary pulley pressure supplied to the primary pulley and a secondary pulley pressure supplied to the secondary pulley;
a line pressure detection unit configured to detect the line pressure; and
a controller configured to control the hydraulic control circuit, wherein
the controller is configured to
select, as a target pulley pressure, a higher one of a target value of the primary pulley pressure and a target value of the secondary pulley pressure, variably set, according to an oil temperature, a target differential pressure including a detection variation of the line pressure detection unit that varies according to the oil temperature, set a target line pressure which is a target value of the line pressure to a total pressure of the target pulley pressure and the target differential pressure, and control the hydraulic control circuit such that the detected line pressure is adjusted to the target line pressure.

2. The transmission according to claim 1, wherein
the controller is configured to set the target differential pressure to be larger in a first oil temperature region in which the detection variation is large than in a second oil temperature region in which the detection variation is smaller than that in the first oil temperature region.

3. The transmission according to claim 2, wherein
the controller is configured to set the target differential pressure to be larger in a low oil temperature region and a high oil temperature region, which are the first oil temperature region, than in an intermediate oil temperature region as the second oil temperature region in which the detection variation is small and which is located between the low oil temperature region and the high oil temperature region.

4. A method for controlling a transmission, the transmission including a primary pulley, a secondary pulley, a transmission member wound around the primary pulley and the secondary pulley, an oil pump configured to supply oil, and a hydraulic control circuit configured to adjust a pressure of the oil supplied from the oil pump to a line pressure which is a source pressure of a primary pulley pressure supplied to the primary pulley and a secondary pulley pressure supplied to the secondary pulley, the method comprising:

detecting the line pressure; and selecting, as a target pulley pressure, a higher one of a target value of the primary pulley pressure and a target value of the secondary pulley pressure, variably setting, according to an oil temperature, a target differential pressure including a detection variation of the line pressure detection unit that varies according to the oil temperature, setting a target line pressure which is a target value of the line pressure to a total pressure of the target pulley pressure and the target differential pressure, and controlling the hydraulic control circuit such that the detected line pressure is adjusted to the target line pressure.

5. A non-transitory computer-readable medium storing a program for controlling a transmission, the transmission including a primary pulley, a secondary pulley, a transmission member wound around the primary pulley and the secondary pulley, an oil pump configured to supply oil, and a hydraulic control circuit configured to adjust a pressure of the oil supplied from the oil pump to a line pressure which is a source pressure of a primary pulley pressure supplied to the primary pulley and a secondary pulley pressure supplied to the secondary pulley, the program causing a computer to execute:

a line pressure detection procedure of detecting the line pressure; and a control procedure of selecting, as a target pulley pressure, a higher one of a target value of the primary pulley pressure and a target value of the secondary pulley pressure, variably setting, according to an oil temperature, a target differential pressure including a detection variation of the line pressure detection unit that varies according to the oil temperature, setting a target line pressure which is a target value of the line pressure to a total pressure of the target pulley pressure and the target differential pressure, and controlling the hydraulic control circuit such that the detected line pressure is adjusted to the target line pressure.

* * * * *